Patented July 30, 1940

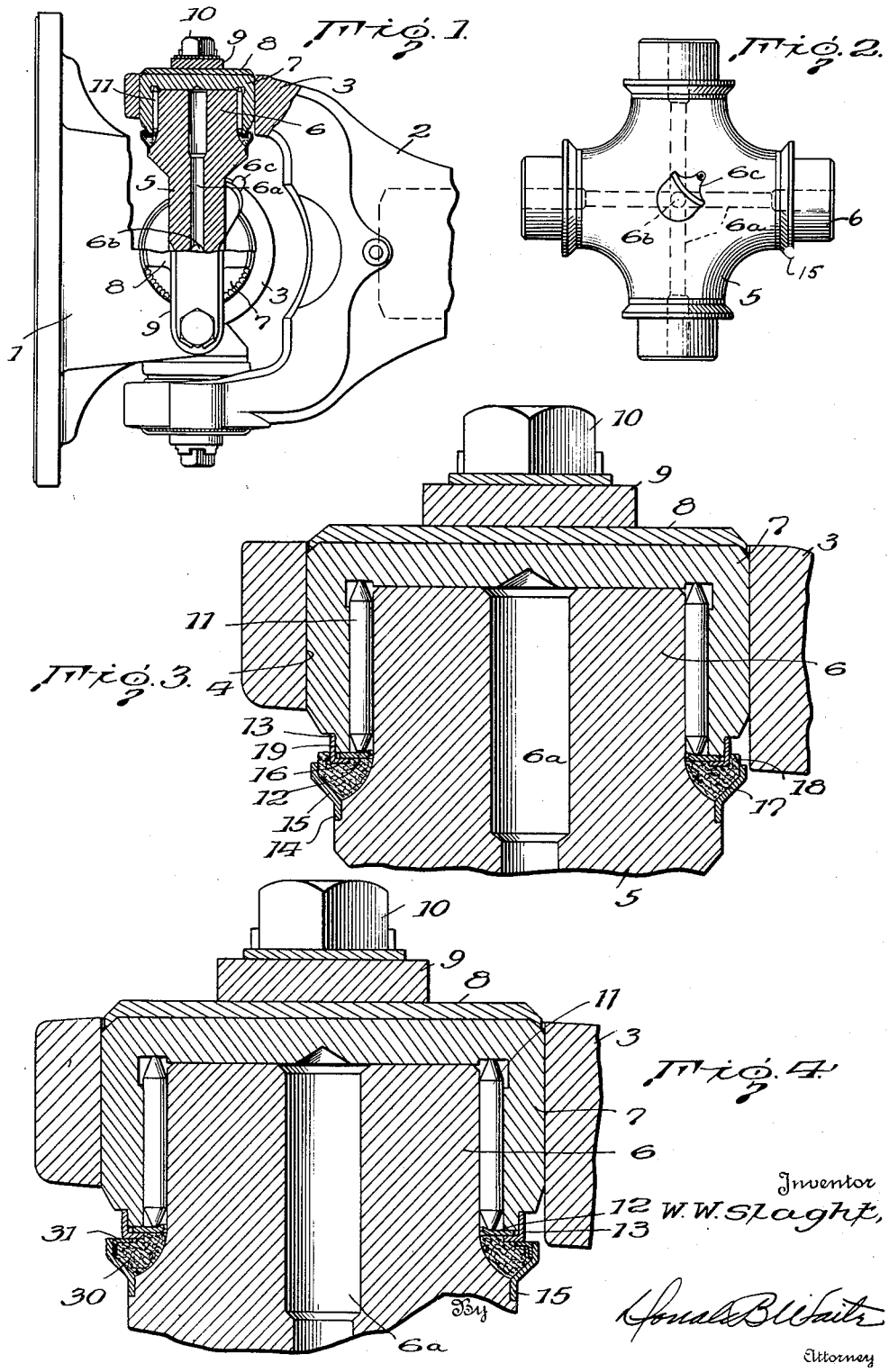

2,209,854

UNITED STATES PATENT OFFICE 2,209,854

UNIVERSAL JOINT

William W. Slaght, Rocky River, Ohio, assignor to Cleveland Steel Products Corp., Cleveland, Ohio, a corporation of Ohio Application October 18, 1938, Serial No. 235,648

2 Claims. (Cl. 64—17)

This invention relates to universal joints, and more particularly to universal joints of the trunnion type.

Heretofore, it has been the practice in many commercial constructions of trunnion type universal joints to provide a cup shaped seal retaining member which overlapped the leak point, that is, such member overlapped the bearing cup or journal, the purpose of which was to exclude dirt and foreign particles from the leak point. In such constructions it was necessary to circumferentially space the retaining member from the bearing cup in order to avoid wear of the retaining member due to friction. Such constructions worked satisfactorily when the vehicle employing the construction was in operation to exclude dirt and foreign particles. However, it has been found that when the vehicle is not in operation, especially after a stop from driving on wet or muddy roads, that water dripping from various parts of the joint would drain into the circumferential space provided by the particular retaining member which is upright or partially so, and carry with it dust and foreign particles or other gritty material, and as the moisture evaporated or disappeared, such particles or gritty material would be left clinging to the oily retainer and would gradually work through the leak point to the trunnion bearing surfaces and cause undue wear.

The principal object of the present invention is to provide a universal joint with new and improved means for sealing the leak point thereof.

Another object is to provide a universal joint with sealing means of new and improved, yet simple, construction for excluding dirt and foreign particles from the trunnion bearing surfaces of the joint.

A further object is to provide a universal joint with a sealing means or grease retainer which is so constructed and arranged that it also overlaps the leak point of the joint trunnions.

With the above and other objects in view, which will be apparent from the following description, the present invention consists in certain features of construction and combinations of parts to be hereinafter described with reference to the accompanying drawing and then claimed.

In the drawing, which illustrates suitable embodiments of the present invention, Figure 1 is a side elevation of a universal joint incorporating the present invention, portions of the same being broken away to show one of the trunnions and bearing means;

Figure 2 is a plan view of the trunnion cross, showing the seal retainers thereon;

Figure 3 is an enlarged fragmentary view showing a bearing cup, one of the trunnions and lubricant retainers in greater detail; and Figure 4 is a view similar to Figure 3, but showing a modification thereof.

Referring to the drawing in which like numerals refer to like parts throughout the views, the universal joint comprises yoke elements 1 and 2, respectively, each having yoke arms 3 provided with a bearing cup aperture 4 therein, a trunnion cross 5 having trunnions 6 arranged at ninety degrees with respect to each other which are arranged, as is well known, to lie within the apertures 4, and bearing cups 7 fitting within the apertures 4 to surround the trunnions 6.

In the construction shown, the trunnions 6 have end thrust engagement with the ends of the bearing cups 7, which cups are held against outward axial movement by members 8 engaging the end faces of the trunnions which are held in place by bars 9 secured by means of cap screws 10 to each yoke arm 3 at opposite sides of the aperture 4 thereof. This particular bearing cup retaining means is of the character shown in my United States Letters Patent 2,114,861, dated April 19, 1938, and forms no part of the present invention.

Also, in the construction shown, I have provided, as is conventional practice, a series of small rollers 11 between the trunnions and the bearing cups 7, which rollers are held in place by annular plates 12 of sheet metal clamped against the open ends of the bearing cups 7 by means of annular stampings 13 of L-shaped section having a pressed fit engagement with the open ends of the bearing cups. It is to be understood that solid bearings or bushings may be used in place of the small rollers 11.

Lubrication of the joint is provided by forming the trunnion cross 5 with intersecting axial passages 6a opening through the trunnion ends and intersecting at 6b at the center of the 5, the intersection or opening 6b being provided with a filler fitting 6c of any suitable type.

Referring to Figure 3, in particular, the trunnion cross 5 is provided at the base of each trunnion 6 with a shoulder 14 and fitted on this shoulder, preferably with a press fit, is an annular shell 15 of sheet metal which provides an annular channel at the base of the trunnion. The plane of the open end of the shell 15 is substantially coincident with the plane of the shorter flange 16 of the L-shaped stamping 13, although, these planes, if desired, may be slightly spaced apart, but not overlapping.

Arranged within this channel, to surround the trunnion 6, is the lubricant retaining member 17, which is preferably of cork material. The member 17 closely engages the shorter flange 16 of the stamping 13 to prevent the leakage of lubricant from the bearing cup 7, as in conventional universal joint practice. Preferably, the lubricant retaining member 17 is under a slight compression. In the present invention, the lubricant retaining member 17 is provided with a peripheral annular flange 18 which projects beyond the sheet metal retainer or shell 15 and overlaps the longer flange 19 of the stamping 13 with close engagement therewith. If desired, the grease retaining member 17 may be of such thickness that when the bearing cup 7 is assembled that it is forced into the cross sectional shape shown in the drawing.

In this construction it is to be noted that no annular pocket is provided by the retaining shell 15, as in conventional present day constructions, which will catch water and dirt and foreign particles dripping from the joint when it is not in operation. Any water dripping from the joint of the present construction will immediately pass over the annular portion 18 of the grease retainer or packing 17 carrying any dirt or foreign particles with it so that they will not gain access to bearing surfaces through the leak point by friction between the lubricant retainer 17 and the shorter flange 16 of the L-shaped stamping 13.

It is to be noted that the shell 15 instead of being cylindrical tapers outwardly from the shoulder 14 to a diameter slightly less than diameter of the aperture 4. By so tapering the shell 15, dirt and foreign particles thrown outwardly by centrifugal force during rotation of the universal joint are caused to be deflected and thrown away from the end portion of the bearing cup 7, thereby minimizing the collection to dirt and dust particles adjacent the packing member 17.

In the construction shown in Figure 4, the joint is identical with that shown in Figure 3, corresponding parts being correspondingly numbered, with the exception of the lubricant retaining or sealing member. In this construction, the lubricant retaining means or packing 30 is completely enclosed within the annular space provided by the trunnion 6, the bearing cup 7 and the shell 15 by means of an annular ring 31 of L-shaped section having one flange in engagement with the inner surface of the shell 15 and the other flange in engagement with the shorter flange 16 of the L-shaped member 13. In order to eliminate wear, this annular ring is formed of extremely thin, flexible metal, such as that known as shim material. In the enlarged view of Figure 4, the thickness of the ring 31 is greatly enlarged for the purpose of illustration. Since the packing 30 is resilient and the ring 31 is also flexible, little pressure will be exerted between the radial flange thereof and the flange 16 with the result that there will be very little wear, if any, on these parts.

The ring 31 will prevent access of all dirt and foreign material to the packing 30 and to the bearing surfaces.

In the two constructions shown, I have provided advantageous universal joint constructions in which improved means is provided for deflecting dirt and foreign particles away from the relatively movable parts thereof, and improved means for preventing access of dirt and foreign particles to the working parts, whereby wear due to foreign material is eliminated and the joint life will be prolonged.

Although specific embodiments of the present invention have been described, it will be evident that various changes may be made in the form, number and arrangement of parts within the spirit and scope thereof, as defined in the appended claims.

What I claim is:

1. In a universal joint apparatus having a plurality of trunnions and bearing cups surrounding said trunnions with the open ends thereof adjacent the bases of their associated trunnions, the combination with each said bearing cup and associated trunnion of lubricant sealing means, comprising an annular shell mounted on the base of said trunnion and extending axially substantially to the transverse plane of the open end of the bearing cup, but not beyond said plane, to provide an annular channel opening toward said open end, an annular lubricant sealing packing within said channel in engagement with said open end, trunnion and shell, and an annular relatively thin resilient metal member having a continuous edge portion positioned between a portion of said packing and said open end and a second continuous edge portion positioned between a portion of said packing and said annular shell whereby to completely enclose said packing.

2. In a universal joint apparatus having a plurality of trunnions and bearing cups surrounding said trunnions with the open ends thereof adjacent the bases of their associated trunnions, the combination with each said bearing cup and associated trunnion of lubricant sealing means, comprising an annular shell mounted on the base of said trunnion and extending axially substantially to the transverse plane of the open end of the bearing cup, but not beyond said plane, to provide an annular channel opening toward said open end, an annular lubricant sealing packing within said channel in engagement with said open end, trunnion and shell, and a thin extremely flexible annular member of L-shaped section having one leg portion positioned between a portion of said packing and said open end and having its other leg portion positioned between a portion of said packing and said annular shell.

WILLIAM W. SLAGHT.